(12) United States Patent
Wei (10) Patent No.: US 10,740,197 B2
(45) Date of Patent: Aug. 11, 2020

(54) QUICK RECOVERY METHOD, DEVICE AND SYSTEM OF A VIRTUAL MACHINE

(71) Applicant: PING AN TECHNOLOGY (SHENZHEN) CO., LTD., Shenzhen, Guangdong (CN)

(72) Inventor: Yudi Wei, Shenzhen (CN)

(73) Assignee: PING AN TECHNOLOGY (SHENZHEN) CO., LTD., Shenzhen (CN)

( * ) Notice: Subject to any disclaimer, the term of this patent is extended or adjusted under 35 U.S.C. 154(b) by 151 days.

(21) Appl. No.: 15/772,798

(22) PCT Filed: Apr. 10, 2017

(86) PCT No.: PCT/CN2017/079912
§ 371 (c)(1),
(2) Date: May 1, 2018

(87) PCT Pub. No.: WO2018/120491
PCT Pub. Date: Jul. 5, 2018

(65) Prior Publication Data
US 2019/0272219 A1 Sep. 5, 2019

(30) Foreign Application Priority Data
Dec. 28, 2016 (CN) .......................... 2016 1 1240016

(51) Int. Cl.
*G06F 11/14* (2006.01)
*G06F 9/455* (2018.01)

(52) U.S. Cl.
CPC ...... *G06F 11/1484* (2013.01); *G06F 9/45545* (2013.01); *G06F 9/45558* (2013.01);
(Continued)

(58) Field of Classification Search
None
See application file for complete search history.

(56) References Cited

U.S. PATENT DOCUMENTS 9,632,881 B1 * 4/2017 Natanzon ............ G06F 11/2076
2016/0110127 A1 4/2016 Qiao et al.

FOREIGN PATENT DOCUMENTS

CN 103559108 A 2/2014
CN 103838593 A 6/2014
(Continued)

*Primary Examiner* — Wynuel S Aquino
(74) *Attorney, Agent, or Firm* — Loza & Loza, LLP (57) ABSTRACT

A quick recovery method, device and system, where the method comprises: forming a first and a second host machine into a storage peer pair, such that read and write requests of a virtual machine of the first host machine are backed up in the second host machine; starting, by a backup host machine, the virtual machine of the first host machine when it goes off; receiving, from the backup host machine, read and write requests transmitted by a calling party, and judging whether full data synchronization from the second host machine to the backup host machine is finished; if it is not finished, transmitting read and write requests to the second host machine; storing data to be written in the second host machine based on the write request, or acquiring data based on the read request and transmitting the data to the backup host machine; transmitting, by the backup host machine, the data to the calling party.

15 Claims, 4 Drawing Sheets

(52) U.S. Cl.
CPC .. *G06F 11/1464* (2013.01); *G06F 2009/4557* (2013.01); *G06F 2009/45595* (2013.01)

(56) References Cited

FOREIGN PATENT DOCUMENTS

| | | |
|---|---|---|
| CN | 104331318 A | 2/2015 |
| CN | 105159798 A | 12/2015 |

* cited by examiner

FIG. 7

QUICK RECOVERY METHOD, DEVICE AND SYSTEM OF A VIRTUAL MACHINE

CROSS-REFERENCE TO RELATED APPLICATIONS

The present application is the U.S. national stage of International Patent Application No. PCT/CN2017/079912, filed on Apr. 10, 2017 and entitled QUICK RECOVERY METHOD, DEVICE AND SYSTEM OF A VIRTUAL MACHINE, which claims the benefit of priority of a Chinese Patent Application No. 201611240016.5 with the title "VIRTUAL MACHINE QUICK RECOVERY METHOD AND DEVICE", which was filed on Dec. 28, 2016. The disclosures of the foregoing applications are incorporated herein by reference in their entirety.

FIELD OF THE INVENTION

The present application relates to the field of computer virtualization technologies, in particular to a quick recovery method, device and system of a virtual machine.

BACKGROUND OF THE INVENTION

The virtualization technology has been one of important functions of an IaaS layer (Infrastructure as a Service). With respect to the virtualization technology, a CPU, memory, I/O, and other devices of a physical machine are virtualized by a virtual machine monitor (VMM) software, a plurality of virtual machines (VMs) are virtualized in one physical machine, and one guest operating system (OS) is operated on each virtual machine. The VMM coordinates with a host operating system (Dom0 or Host OS), to ensure the isolation of the virtual machines located on the same physical machine and online migration of the VM from one physical machine to another physical machine without going down (including the online migration based on shared storage and online migration based on local storage). The virtualization technology has found its wide applications in various large data centers and IaaS platforms in cloud computation environments due to its advantages in VM function and performance isolation, load balancing and system fault tolerance based on VM online migration, application portability, resource utilization rate improvement, operation & maintenance and cost reduction. Its typical applications include high performance computations, big data processing, Web transaction processing, or the like.

In a current cloud storage scheme based on a kernel-based virtual machine (KVM), read and write requests of the virtual machine are directly stored in a host machine locally. When the host machine where the virtual machine is located goes down or the host machine where the virtual machine is located cannot continue a service due to other failures, the virtual machine cannot be recovered quickly since there is no available storage to be accessed by the virtual machine, thereby interrupting the service on the virtual machine.

SUMMARY OF THE INVENTION

The present application provides a quick recovery method, device and system of a virtual machine, so as to solve the problem that the virtual machine cannot be recovered quickly when the host machine where the virtual machine is located goes down.

The present application provides the following technical solution to solve its technical problems.

In a first aspect, the present application provides a virtual machine quick recovery method, including:

forming a first host machine and a second host machine into a storage peer pair, such that read and write requests of a virtual machine of the first host machine are backed up in the second host machine;

starting, by a backup host machine, the virtual machine of the first host machine when the first host machine goes down or powers off;

receiving, by the virtual machine started in the backup host machine, read and write requests transmitted by a calling party, and judging whether full data synchronization from the second host machine to the backup host machine is finished or not; if the full data synchronization from the second host machine to the backup host machine is not finished, transmitting read and write requests to the second host machine;

receiving, by the second host machine, the read and write requests, storing data to be written in the second host machine based on the write request, or acquiring specified data based on the read request and transmitting the specified data to the backup host machine;

transmitting, by the backup host machine, the specified data to the calling party.

In a second aspect, the present application further provides a virtual machine quick recovery device, including:

a data backup unit, for forming a first host machine and a second host machine into a storage peer pair, such that read and write requests of a virtual machine of the first host machine are backed up in the second host machine;

a backup machine starting unit, for starting, by a backup host machine, the virtual machine of the first host machine when the first host machine goes down or powers off;

a request judging unit, for making the virtual machine started in the backup host machine receive read and write requests transmitted by a calling party, and judging whether full data synchronization from the second host machine to the backup host machine is finished or not; if the full data synchronization from the second host machine to the backup host machine is not finished, transmitting read and write requests to the second host machine;

a first processing unit, for making the second host machine receive the read and write requests, storing data to be written in the second host machine based on the write request, or acquiring specified data based on the read request and transmitting the specified data to the backup host machine;

a data transmitting unit, for making the backup host machine transmit the specified data to the calling party.

In a third aspect, the present application further provides a virtual machine quick recovery system, including a first host machine, a second host machine and a backup host machine; the first host machine, the second host machine and the third host machine are provided with processors respectively, the processor executing the following steps:

forming a first host machine and a second host machine into a storage peer pair, such that read and write requests of a virtual machine of the first host machine are backed up in the second host machine;

starting, by a backup host machine, the virtual machine of the first host machine when the first host machine goes down or powers off;

receiving, by the virtual machine started in the backup host machine, read and write requests transmitted by a calling party, and judging whether full data synchronization from the second host machine to the backup host machine is finished or not; if the full data synchronization from the second host machine to the backup host machine is not finished, transmitting read and write requests to the second host machine;

receiving, by the second host machine, the read and write requests, storing data to be written in the second host machine based on the write request, or acquiring specified data based on the read request and transmitting the specified data to the backup host machine;

transmitting, by the backup host machine, the specified data to the calling party.

Compared with the prior art, the present application has the following advantages. In the quick recovery method, device and system of a virtual machine according to the present application, when the first host machine goes down or powers off, the virtual machine on the first host machine is started in the backup host machine; when the full data synchronization from the second host machine to the backup host machine is not finished, the read and write requests received by the virtual machine of the backup host machine are forwarded to and executed in the second host machine with virtual machine backup data, which may realize quick migration and failure recovery of the virtual machine without storage, does not need the shared storage, improve robust of the virtual machine, and avoid interruption of service on the virtual machine due to the absence of available storage to be accessed by the virtual machine.

BRIEF DESCRIPTION OF THE DRAWINGS

The present application will be further explained below in combination with drawings and embodiments, wherein.

DETAILED DESCRIPTION OF THE PREFERRED EMBODIMENT

In order to make the technical features, purposes, and effects of the present application be clearer and more understandable, the present application will be described in detail below with reference to accompanying figures.

First Embodiment

Figure 1:
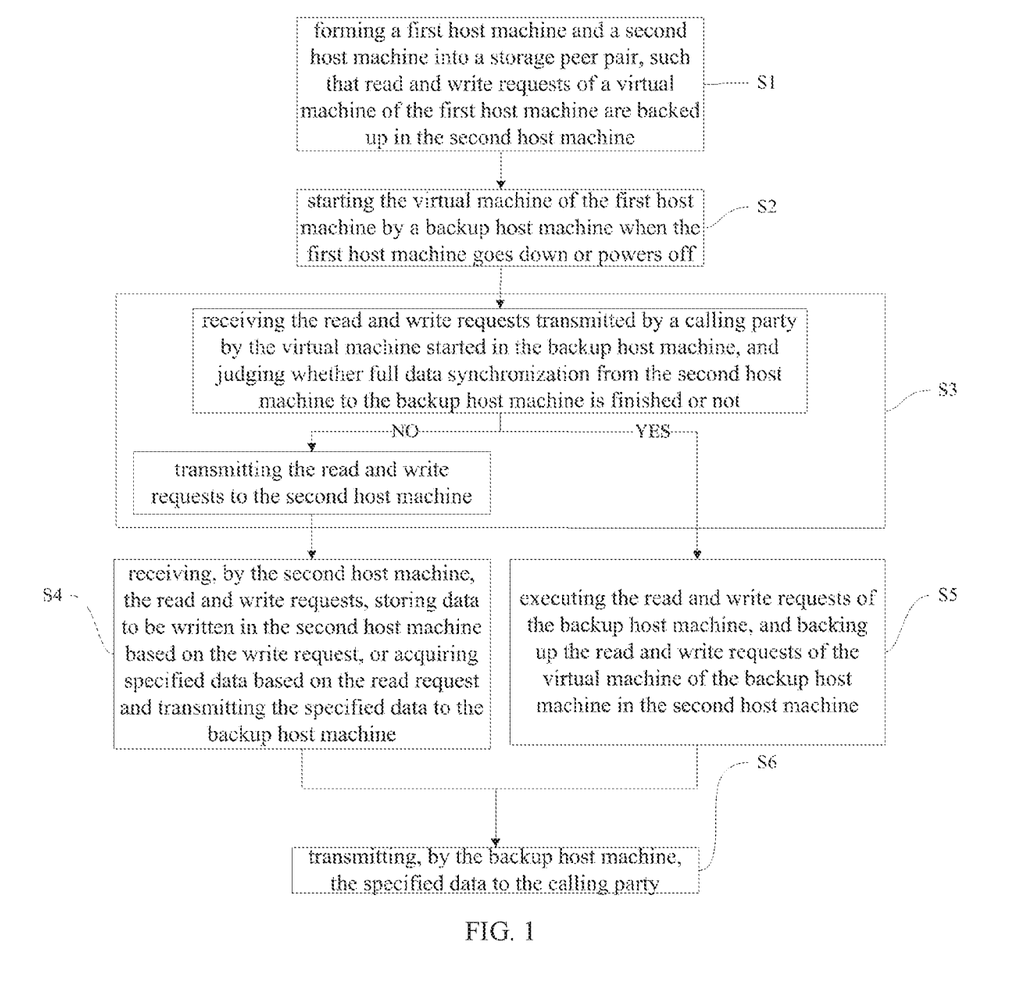
FIG. 1 is a flow chart of a virtual machine quick recovery method according to the first embodiment of the present application.

FIG. 1 shows the virtual machine quick recovery method according to the present embodiment. As shown in FIG. 1, the virtual machine quick recovery method includes the following steps.

In S1, a first host machine and a second host machine are formed into a storage peer pair, such that read and write requests of a virtual machine of the first host machine are backed up in the second host machine. Correspondingly, the read and write requests in the second host machine are also backed up on the first host machine. The virtual machines of the first host machine and the second host machine forming the storage peer pair are independent mutually, but the read and write requests executed on the virtual machine are backed up mutually.

In S2, the virtual machine of the first host machine is started by a backup host machine when the first host machine goes down or powers off. When the first host machine cannot continue the service since it goes down or powers off, it needs to start the virtual machine of the first host machine on another machine which is functioning properly, so as to ensure timely recovery of the service provided by the virtual machine of the first host machine. The power-off state refers to shutting down the host machine, such that the computer is turned off completely. The going-down state means that the host machine cannot recover from a serious system error, or that there is something wrong with system hardware, so that the system has no response for a long time. Therefore, the backup host machine is a backup machine which is functioning properly in a cluster. The hardware configuration of the backup host machine needs to satisfy the needs of starting all virtual machines on the first host machine, thereby ensuring timely recovery of the service provided by the virtual machine of the first host machine. Hereinafter, the virtual machine of the first host machine started in the backup host machine is referred to as the virtual machine of the backup host machine.

In S3, read and write requests transmitted by a calling party is received by the virtual machine started in the backup host machine, and it is judged whether full data synchronization from the second host machine to the backup host machine is finished or not. If the full data synchronization from the second host machine to the backup host machine is not finished, the read and write requests is transmitted to the second host machine. If the full data backup from the second host machine to the backup host machine is finished, the read and write requests are executed in the backup host machine, without transmitting the read and write requests to the second host machine, with the reason that the migration of the virtual machine of the first host machine is finished and the virtual machine is stabilized again. It is to be understood that if the full data backup from the second host machine to the backup host machine is finished, the second host machine and the backup host machine form into a new storage peer pair, such that the virtual machines of the second host machine and the backup host machine can realize the data backup, so as to ensure that their virtual machines can access data even when the second host machine and the backup host machine go down or do not work due to other failures.

In S4, if the full data synchronization from the second host machine to the backup host machine is not finished, the read and write requests are transmitted to the second host machine; the second host machine stores data to be written in the second host machine based on the write request, or acquires specified data based on the read request and transmits the specified data to the backup host machine; the backup host machine transmits the specified data to the calling party. That is, if the full data synchronization from the second host machine to the backup host machine is not finished, the virtual machine of the first host machine is not migrated into the backup host machine completely, the backup host machine cannot process the read and write requests received by the virtual machine started thereon, and the read and write requests are forwarded to the second host machine where the virtual machine data is backed up, to be processed. The virtual machine can be quickly recovered, and the interruption of the service on the virtual machine is avoided.

In S5, if the full data synchronization from the second host machine to the backup host machine is finished, the read and write requests are executed in the backup host machine, and the read and write requests of the virtual machine of the backup host machine are backed up in the second host machine. In an embodiment, the process of executing the read and write requests in the backup host machine is the same as the process of executing the read and write requests in the second host machine, i.e., the data to be written is stored in the backup host machine based on the write request, or the specified data is acquired based on the read request. That is, if the full data synchronization from the second host machine to the backup host machine is finished, when the backup host machine starts the virtual machine and receives the read and write requests, the read and write requests are stored in a local disk of the backup host machine directly, and are not jumped onto the second host machine to be executed. However, the read and write requests of the virtual machine of the backup host machine are backed up onto the second host machine, with the same backup process as the step S1.

In S6, the backup host machine transmits the specified data to the calling party. It can be understood that if the full data synchronization from the second host machine to the backup host machine is finished, the read and write requests are executed in the backup host machine, and the specified data corresponding to the read request is acquired and transmitted to the calling party. Or, if the full data synchronization from the second host machine to the backup host machine is not finished, the read and write requests are transmitted to the second host machine, the read and write requests are executed in the second host machine, and the specified data corresponding to the read request is acquired and transmitted to the calling party.

In the virtual machine quick recovery method according to the present embodiment, when the first host machine goes down or powers off or cannot continue service due to other failures, the virtual machine on the first host machine may be started in the backup host machine; when the full data synchronization from the second host machine to the backup host machine is not finished, the read and write requests received by the virtual machine of the backup host machine are forwarded to and executed in the second host machine with the virtual machine backup data, which may realize quick migration and failure recovery of the virtual machine without storage, does not need the shared storage, improve robust of the virtual machine, and avoid interruption of service on the virtual machine due to the absence of available storage to be accessed by the virtual machine.

The virtual machine quick recovery method will be explained below in combination with embodiments. In one embodiment, the virtual machine quick recovery method includes the following steps.

Figure 2:
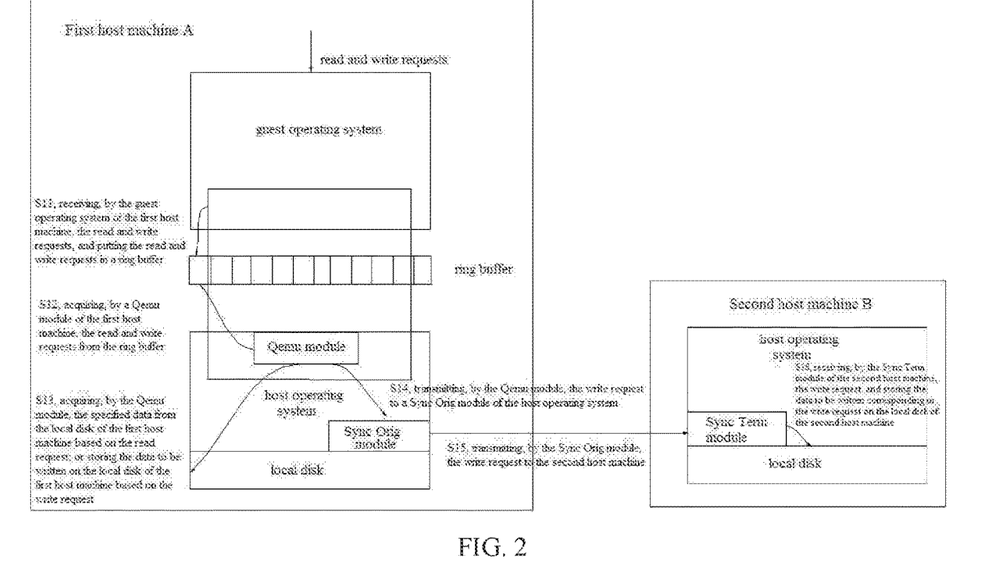
FIG. 2 is a specific flow chart of step S1 in the virtual machine quick recovery method as shown in FIG. 1.

In S1, a first host machine A and a second host machine B are formed into a storage peer pair, such that read and write requests of a virtual machine of the first host machine A are backed up in the second host machine B. Correspondingly, the read and write requests of the virtual machine of the second host machine B are also backed up on the first host machine A. The virtual machines of the first host machine A and the second host machine B are independent mutually, but the virtual machine data is backed up mutually, so as to prevent the first host machine A and the second host machine B from going down or functioning improperly due to other failures, and avoid the interruption of service provided by the virtual machine since the virtual machine cannot quickly recover. As shown in FIG. 2, the step S1 includes the following steps.

In S11, the guest operating system of the first host machine A receives the read and write requests, and puts the read and write requests in a ring buffer. The guest operating system is the one which is operating on the virtual machine of the first host machine A. The ring buffer is a data structure for storing data received and transmitted during communication in a communication program, and providing the communication program with mutually exclusive access to the buffer.

In S12, a Qemu module of the first host machine A acquires the read and write requests from the ring buffer. The Qemu module is configured in the host operating system of the first host machine, and the read and write requests are not processed. Qemu is software which can be run separately, for simulating a machine, with relatively high flexibility and portability. The Qemu mainly converts a binary code edited for a specific processor into another code by a special "re-compiler", such as an MIPS code run on PPCmac or an ARM code run on X86 PC. An IO path in the Qemu module is mainly divided into three layers: a virtio back end (a), a universal block equipment layer (b) and a driver layer (c). By inserting a part of codes in an interface of the virtio back end (a) and the universal block equipment layer (b), the read and write requests are transferred to the second host machine B, to be locally backed up.

In S13, the Qemu module of the first host machine A acquires the specified data from the local disk of the first host machine A based on the read request; or the Qemu module of the first host machine A stores the data to be written in the local disk of the first host machine A based on the write request.

In S14, the Qemu module of the first host machine A transmits the write request to a Sync Orig module of the host operating system. As a module for forwarding read and write requests of the first host machine A, the Sync Orig module is configured in the host operating system of the first host machine A.

In S15, the Sync Orig module of the host operating system transmits the write request to the Sync Term module of the second host machine B. The Sync Orig module of the first host machine A is connected with the Sync Term module of the second host machine B through a network.

In S16, the Sync Term module of the second host machine receives the write request, and stores the data to be written corresponding to the write request in the local disk of the second host machine, so as to realize the backup of the write request, in the second host machine B, on the virtual machine of the first host machine A. As a module for receiving read and write requests of the second host machine B, the Sync Term module is configured in the host operating system of the second host machine B.

Further, a pseudo code of the storage peer pair formed by the first host machine A and the second host machine B is as follows.
Host A config file:
Peer ID=1
Host B config file:
Peer ID=1
Having been started, the first host machine A and the second host machine B report their own Peer IDs to the server toward cloud respectively, and the server registers two host machines with the same Peer ID as a storage Peer pair.

```
If (host A. Peer Id == host B. peer Id)
    {Peer peer = new Peer (host A, host B);
    peer. add (peer); }
```

Further, the pseudo code of backing up the read and write requests of the virtual machine of the first host machine A in the second host machine B includes: having received the write request, the Qemu module of the first host machine A stores the data to be written corresponding to the write request in the shared memory of the host operating system of the first host machine A, other than storing the data to be written corresponding to the write request in the local disk of the first host machine A. Then, one sequence number is generated for the write request, a start number of the sector to be modified by the write request and the number of the sectors are filled in the request, to be processed by the Sync Orig module of the host operating system. The host operating system receives the request, forms the request and the data to be written in the shared memory into one TCP data packet, and transmits the same to the host operating system of the second host machine B. The host operating system of the second host machine B writes the data to be written in the data packet in the specified sector of the request, thereby realizing the backup of the write request of the virtual machine of the host operating system in the host operating system.

In S2, the virtual machine of the first host machine A is started by a backup host machine C when the first host machine A goes down. In the present embodiment, when the first host machine A goes down or cannot continue the service, it needs to start the virtual machine of the first host machine A on another machine which is functioning properly, so as to ensure timely recovery of the service provided by the virtual machine of the first host machine A. Sine a certain number of virtual machines has been carried in the second host machine B, if the virtual machine of the first host machine A is migrated to the second host machine B to be recovered, the virtual machine of the second host machine B may have an overhigh access load although the virtual machine data of the first host machine A backed up in the local disk of the second host machine B can be acquired immediately, which may influence the ability of the second host machine B to provide service externally. The backup host machine C is a backup machine which is functioning properly in a cluster. The hardware configuration of the backup host machine C needs to satisfy the needs of starting all virtual machines on the first host machine A, thereby ensuring timely recovery of the service provided by the virtual machine of the first host machine A. Hereinafter, the virtual machine of the first host machine A started in the backup host machine C is referred to as the virtual machine of the backup host machine C.

Figure 3:
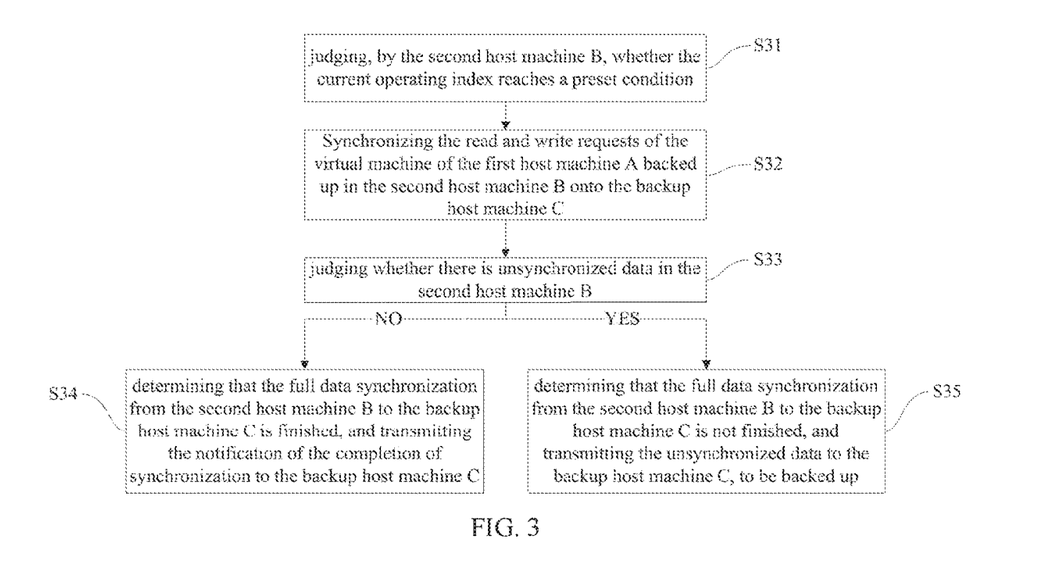
FIG. 3 is a specific flow chart of step S3 in the virtual machine quick recovery method as shown in FIG. 1.

In S3, the read and write requests transmitted by a calling party is received by the virtual machine started in the backup host machine C, and it is judged whether full data synchronization from the second host machine B to the backup host machine C is finished or not. In the embodiment, the backup host machine C judges whether a notification of the completion of synchronization transmitted to the second host machine is provided. If the notification of the completion of synchronization is received, it is affirmed that the full data synchronization from the second host machine B to the backup host machine C is finished; otherwise, the full data synchronization from the second host machine B to the backup host machine C is not finished. As shown in FIG. 3, the step S3 includes the following steps.

In S31, the second host machine B judges whether the current operating index reaches a preset condition. That is, after the virtual machine of the first host machine A is started in the backup host machine C, the second host machine B detects in real time the current operating indices such as current network throughput and disk access, and after each of the current operating indices reaches the preset condition, the step S32 is executed.

In S32, if the current operating index reaches a preset condition, the read and write requests of the virtual machine of the first host machine A backed up in the second host machine B are synchronized onto the backup host machine C, i.e., the virtual machine data of the second host machine B is synchronized onto the backup host machine C.

In S33, it is judged whether there is unsynchronized data in the second host machine B. The second host machine B also judges in real time whether there is unsynchronized data, so as to determine whether the full data synchronization from the second host machine B to the backup host machine C is finished or not.

In S34, if there is unsynchronized data, the full data synchronization from the second host machine B to the backup host machine C is not finished, and the unsynchronized data is transmitted to the backup host machine C, to be backed up.

In S35, if there is no unsynchronized data, the full data synchronization from the second host machine B to the backup host machine C is finished, and the notification of the completion of synchronization is transmitted to the backup host machine C.

Further, in step S3, the guest operating system of the backup host machine C receives the read and write requests, and puts the read and write requests in a ring buffer.

Figure 4:
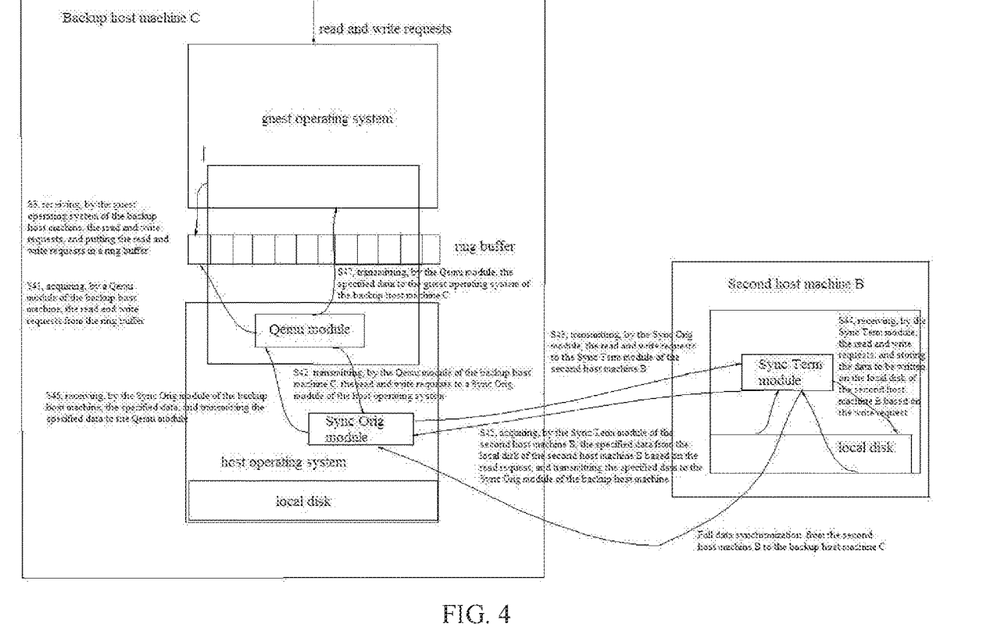
FIG. 4 is a specific flow chart of step S4 in the virtual machine quick recovery method as shown in FIG. 1.

In S4, if the full data synchronization from the second host machine B to the backup host machine C is not finished, the read and write requests are transmitted to the second host machine B; the second host machine B stores data to be written in the second host machine B based on the write request, or acquires the specified data based on the read request and transmits the specified data to the backup host machine C; the backup host machine C transmits the specified data to the calling party. As shown in FIG. 4, the step S4 includes the following steps.

In S41, a Qemu module of the backup host machine C acquires the read and write requests from the ring buffer.

In S42, the Qemu module of the backup host machine C transmits the read and write requests to a Sync Orig module of the host operating system.

In S43, the Sync Orig module transmits the read and write requests to the Sync Term module of the second host machine B.

In S44, the Sync Term module of the second host machine B receives the read and write requests, and stores the data to be written in the local disk of the second host machine B based on the write request.

In S45, the Sync Term module of the second host machine B acquires the specified data from the local disk of the second host machine B based on the read request, and transmits the specified data to the Sync Orig module of the backup host machine C.

In S46, the Sync Orig module of the backup host machine receives the specified data, and transmits the specified data to the Qemu module of the backup host machine C.

In S47, the Qemu module of the backup host machine C transmits the specified data to the guest operating system of the backup host machine C, so as to transmit to the calling party.

Further, a pseudo code of transferring the read and write requests of the virtual machine of the backup host machine C to the second host machine B to be processed is as follows.

Before the Qemu module of the backup host machine C is started, in its configuration file, a remoteI0 flag is set to be True.

When the Qemu module of the backup host machine C is started, it is read that remoteI0=True, the local disk access is not performed on each of the I0 requests received since then (that is, the read and write requests), but the Sync Orig module is notified by the shared memory to forward the I0 requests to the second host machine B.

After the Sync Term module of the second host machine B receives the write request of the Sync Orig module of the backup host machine C, the write data is stored in the local disk of the backup host machine C.

After the Sync Term module of the second host machine B receives the write request of the Sync Orig module of the backup host machine C, and the specified data is read from the specified sector, the request is transmitted back to the Sync Orig module of the backup host machine C through TCP.

After the Sync Orig module of the backup host machine C receives the specified data fed back by the second host machine B, this fed-back specified data is written in the shared memory, and the Qemu module of the backup host machine C is notified through a TCP message.

After the Qemu module of the backup host machine C receives the TCP message notification of the Sync Orig module of the backup host machine C, the specified data is acquired from the specified shared memory and fed back to the calling party.

After the virtual machine is stable in the backup host machine, the data synchronization from the second host machine B to the backup host machine C is started. After the storage migration of the virtual machine to the backup host machine C is finished, a pseudo code of starting the process of the full data synchronization from the second host machine B to the backup host machine C is as follows.

The Sync Term module of the second host machine B transmits the written sectors to the Sync Orig module of the backup host machine C one by one by analyzing a writing situation of the sectors of a qcow2 file of the local disk. After the Sync Orig module of the backup host machine C receives the synchronized sector data transmitted from the Sync Term module of the second host machine B, the data content is written in the qcow2 file of the local disk.

The pseudo code executed in the second host machine B is as follows:

```
For (every written sector)
   {Send_to_host C (sectorIdx, sector_data); }
```

The pseudo code executed in the backup host machine C is as follows:

```
For (sector_data receive from host B)
   {Write qcow2file, sector Idx, sector_data); }
```

After the full data synchronization is finished, the backup host machine C recovers the read and write requests of the virtual machine to be executed in the local disk of the backup host machine C, and does not forward the read and write requests to the second host machine B. At this point, the pseudo code executed in the second host machine B is as follows:

```
If (every_writen_sector_send == true)
   {Send_to_host C (all_data_synchronized = true);}
```

The pseudo code executed in the backup host machine C is as follows:

```
If (Received_msg (host B, all_data_synchronized = true))
   {Qemu. remoteIO = False;}
```

Second Embodiment

Figure 5:
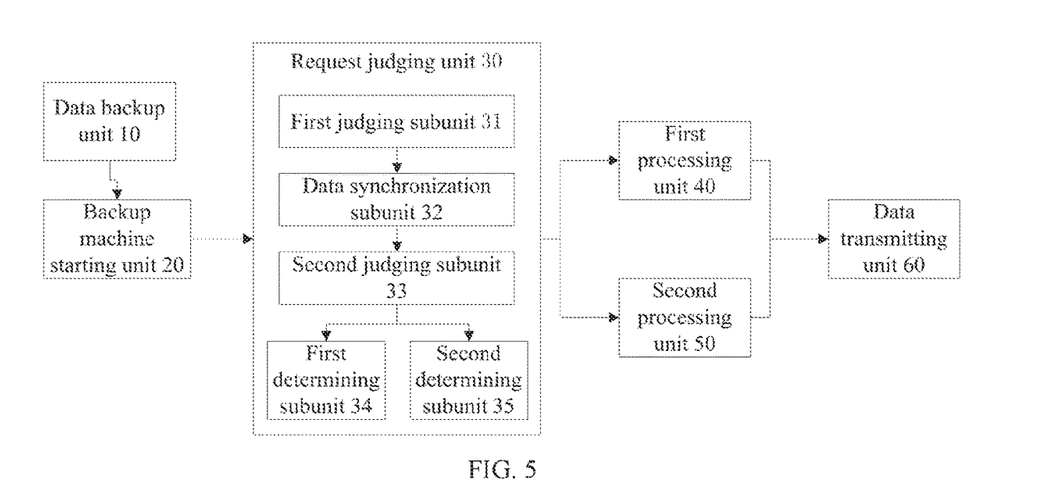
FIG. 5 is a schematic block diagram of a virtual machine quick recovery device according to the second embodiment of the present application.

FIG. 5 shows a virtual machine quick recovery device according to the present embodiment. As shown in FIG. 5, the virtual machine quick recovery device includes a data backup unit 10, a backup machine starting unit 20, a request judging unit 30, a first processing unit 40 and a second processing unit 50.

The data backup unit 10 is used for forming a first host machine and a second host machine into a storage peer pair, such that read and write requests of a virtual machine of the first host machine are backed up in the second host machine. Correspondingly, the read and write requests in the second host machine are also backed up on the first host machine. The virtual machines of the first host machine and the second host machine forming the storage peer pair are independent mutually, but the read and write requests executed on the virtual machine are backed up mutually.

The backup machine starting unit is used for starting the virtual machine of the first host machine by a backup host machine when the first host machine goes down or powers off. When the first host machine cannot continue the service since it goes down or powers off, it needs to start the virtual machine of the first host machine on another machine which is functioning properly, so as to ensure timely recovery of the service provided by the virtual machine of the first host machine. The power-off state refers to shutting down the host machine, such that the computer is turned off completely. The going-down state means that the host machine cannot recover from a serious system error, or that there is something wrong with system hardware, so that the system has no response for a long time. Therefore, the backup host machine is a backup machine which is functioning properly in a cluster. The hardware configuration of the backup host machine needs to satisfy the needs of starting all virtual machines on the first host machine, thereby ensuring timely recovery of the service provided by the virtual machine of the first host machine. Hereinafter, the virtual machine of the first host machine started in the backup host machine is referred to as the virtual machine of the backup host machine.

The request judging unit 30 is used for making the virtual machine started in the backup host machine receive the read and write requests transmitted by a calling party, and judging whether full data synchronization from the second host machine to the backup host machine is finished or not. If the full data synchronization from the second host machine to the backup host machine is not finished, the read and write requests is transmitted to the second host machine. If the full data backup from the second host machine to the backup host machine is finished, the read and write requests are executed in the backup host machine, without transmitting the read and write requests to the second host machine, with the reason that the migration of the virtual machine of the first host machine is finished and the virtual machine is stabilized again. It is to be understood that if the full data backup from the second host machine to the backup host machine is finished, the second host machine and the backup host machine form into a new storage peer pair, such that the virtual machines of the second host machine and the backup host machine can realize the data backup, so as to ensure that their virtual machines can access data even when the second host machine and the backup host machine go down or do not work due to other failures.

The first processing unit 40 is used for transmitting the read and write requests to the second host machine if the full data synchronization from the second host machine to the backup host machine is not finished; the second host machine stores data to be written in the second host machine based on the write request, or acquires specified data based on the read request and transmits the specified data to the backup host machine; the backup host machine transmits the specified data to the calling party. That is, if the full data synchronization from the second host machine to the backup host machine is not finished, the virtual machine of the first host machine is not migrated into the backup host machine completely, the backup host machine cannot process the read and write requests received by the virtual machine started thereon, and the read and write requests are forwarded to the second host machine where the virtual machine data is backed up, to be processed. The virtual machine can be quickly recovered, and the interruption of the service on the virtual machine is avoided.

The second processing unit 50 is used for executing the read and write requests in the backup host machine and backing up the read and write requests of the virtual machine of the backup host machine in the second host machine if the full data synchronization from the second host machine to the backup host machine is finished. In an embodiment, the process of executing the read and write requests in the backup host machine is the same as the process of executing the read and write requests in the second host machine, i.e., the data to be written is stored in the backup host machine based on the write request, or the specified data is acquired based on the read request. That is, if the full data synchronization from the second host machine to the backup host machine is finished, when the backup host machine starts the virtual machine and receives the read and write requests, the read and write requests are stored in a local disk of the backup host machine directly, and are not jumped onto the second host machine to be executed. However, the read and write requests of the virtual machine of the backup host machine are backed up onto the second host machine, with the same backup process as the data backup process of the data backup unit 10.

The data transmitting unit 60 is used for making the backup host machine transmit the specified data to the calling party. It can be understood that if the full data synchronization from the second host machine to the backup host machine is finished, the read and write requests are executed in the backup host machine, and the specified data corresponding to the read request is acquired and transmitted to the calling party. Or, if the full data synchronization from the second host machine to the backup host machine is not finished, the read and write requests are transmitted to the second host machine, the read and write requests are executed in the second host machine, and the specified data corresponding to the read request is acquired and transmitted to the calling party.

In the virtual machine quick recovery device according to the present embodiment, when the first host machine goes down or powers off or cannot continue service due to other failures, the virtual machine on the first host machine may be started in the backup host machine; when the full data synchronization from the second host machine to the backup host machine is not finished, the read and write requests received by the virtual machine of the backup host machine are forwarded to and executed in the second host machine with the virtual machine backup data, which may realize quick migration and failure recovery of the virtual machine without storage, does not need the shared storage, improve robust of the virtual machine, and avoid interruption of service on the virtual machine due to the absence of available storage to be accessed by the virtual machine.

The virtual machine quick recovery device will be explained below in combination with embodiments. In one embodiment, the virtual machine quick recovery device includes:

a data backup unit 10, for forming a first host machine A and a second host machine B into a storage peer pair, such that read and write requests of a virtual machine of the first host machine A are backed up in the second host machine B. Correspondingly, the read and write requests of the virtual machine of the second host machine B are also backed up on the first host machine A. The virtual machines of the first host machine A and the second host machine B are independent mutually, but the virtual machine data is backed up mutually, so as to prevent the first host machine A and the second host machine B from going down or functioning improperly due to other failures, and avoid the interruption of service provided by the virtual machine since the virtual machine cannot quickly recover. In the embodiment, the data backup unit 10 includes:

a guest operating system of the first host machine A, for receiving the read and write requests, and putting the read and write requests in a ring buffer. The guest operating system is the one which is operating on the virtual machine of the first host machine A. The ring buffer is a data structure for storing data received and transmitted during communication in a communication program, and providing the communication program with mutually exclusive access to the buffer.

A Qemu module of the first host machine A, for acquiring the read and write requests from the ring buffer. The Qemu module is configured in the host operating system of the first host machine, and the read and write requests are not processed. Qemu is software which can be run separately, for simulating a machine, with relatively high flexibility and portability. The Qemu mainly converts a binary code edited for a specific processor into another code by a special "re-compiler", such as an MIPS code run on PPCmac or an ARM code run on X86 PC. An IO path in the Qemu module is mainly divided into three layers: a virtio back end (a), a universal block equipment layer (b) and a driver layer (c). By inserting a part of codes in an interface of the virtio back end (a) and the universal block equipment layer (b), the read and write requests are transferred to the second host machine B, to be locally backed up.

A Qemu module of the first host machine A, for acquiring the specified data from the local disk of the first host machine A based on the read request; or the Qemu module of the first host machine A stores the data to be written in the local disk of the first host machine A based on the write request.

A Qemu module of the first host machine A, for transmitting the write request to a Sync Orig module of the host operating system. As a module for forwarding read and write requests of the first host machine A, the Sync Orig module is configured in the host operating system of the first host machine A.

A Sync Orig module of the host operating system, for transmitting the write request to the Sync Term module of the second host machine B. The Sync Orig module of the first host machine A is connected with the Sync Term module of the second host machine B through a network.

A Sync Term module of the second host machine, for receiving the write request, and stores the data to be written corresponding to the write request in the local disk of the second host machine, so as to realize the backup of the write request, in the second host machine B, on the virtual machine of the first host machine A. As a module for receiving read and write requests of the second host machine B, the Sync Term module is configured in the host operating system of the second host machine B.

Further, a pseudo code of the storage peer pair formed by the first host machine A and the second host machine B is as follows.

Host A config file:
Peer ID=1
Host B config file:
Peer ID=1

Having been started, the first host machine A and the second host machine B report their own Peer IDs to the server toward cloud respectively, and the server registers two host machines with the same Peer ID as a storage Peer pair.

```
If( hostA. peerId == hostB. Peer Id)
{ Peer peer = new Peer (host A, host B);
  peer. Add (peer); }
```

Further, the pseudo code of backing up the read and write requests of the virtual machine of the first host machine A in the second host machine B includes: having received the write request, the Qemu module of the first host machine A stores the data to be written corresponding to the write request in the shared memory of the host operating system of the first host machine A, other than storing the data to be written corresponding to the write request in the local disk of the first host machine A. Then, one sequence number is generated for the write request, a start number of the sector to be modified by the write request and the number of the sectors are filled in the request, to be processed by the Sync Orig module of the host operating system. The host operating system receives the request, forms the request and the data to be written in the shared memory into one TCP data packet, and transmits the same to the host operating system of the second host machine B. The host operating system of the second host machine B writes the data to be written in the data packet in the specified sector of the request, thereby realizing the backup of the write request of the virtual machine of the host operating system in the host operating system.

A backup machine starting unit 20, for starting the virtual machine of the first host machine A by a backup host machine C when the first host machine A goes down. In the present embodiment, when the first host machine A goes down or cannot continue the service, it needs to start the virtual machine of the first host machine A on another machine which is functioning properly, so as to ensure timely recovery of the service provided by the virtual machine of the first host machine A. Sine a certain number of virtual machines has been carried in the second host machine B, if the virtual machine of the first host machine A is migrated to the second host machine B to be recovered, the virtual machine of the second host machine B may have an overhigh access load although the virtual machine data of the first host machine A backed up in the local disk of the second host machine B can be acquired immediately, which may influence the ability of the second host machine B to provide service externally. The backup host machine C is a backup machine which is functioning properly in a cluster. The hardware configuration of the backup host machine C needs to satisfy the needs of starting all virtual machines on the first host machine A, thereby ensuring timely recovery of the service provided by the virtual machine of the first host machine A. Hereinafter, the virtual machine of the first host machine A started in the backup host machine C is referred to as the virtual machine of the backup host machine C.

A request judging unit 30, for making the virtual machine started in the backup host machine C receive the read and write requests transmitted by a calling party, and judging whether full data synchronization from the second host machine B to the backup host machine C is finished or not. In the embodiment, the backup host machine C judges whether a notification of the completion of synchronization transmitted to the second host machine is provided. If the notification of the completion of synchronization is received, it is affirmed that the full data synchronization from the second host machine B to the backup host machine C is finished; otherwise, the full data synchronization from the second host machine B to the backup host machine C is not finished.

As shown in FIG. 5, the request judging unit 30 includes a first judging subunit 31, a first synchronization subunit 32, a second judging subunit 33, a first determining subunit 34 and a second determining subunit 35.

The first judging subunit 31 is used for making the second host machine B judge whether the current operating index reaches a preset condition. That is, after the virtual machine of the first host machine A is started in the backup host machine C, the second host machine B detects in real time the current operating indices such as current network throughput and disk access, and after each of the current operating indices reaches the preset condition, the step S32 is executed.

The first synchronization unit 32 is used for synchronizing the read and write requests of the virtual machine of the first host machine A backed up in the second host machine B onto the backup host machine C, if a preset condition is reached, i.e., the virtual machine data of the second host machine B is synchronized onto the backup host machine C.

The second judging subunit 33 is used for judging whether there is unsynchronized data in the second host machine B. The second host machine B also judges in real time whether there is unsynchronized data, so as to determine whether the full data synchronization from the second host machine B to the backup host machine C is finished or not.

The first determining subunit 34 is used for determining that the full data synchronization from the second host machine B to the backup host machine C is not finished if there is unsynchronized data, and transmitting the unsynchronized data to the backup host machine C, to be backed up.

The second determining subunit 35 is used for determining that the full data synchronization from the second host machine B to the backup host machine C is finished if there is no unsynchronized data, and transmitting the notification of the completion of synchronization to the backup host machine C.

In the request judging unit 30, the guest operating system of the backup host machine C receives the read and write requests, and puts the read and write requests in a ring buffer.

The first processing unit 40 is used for transmitting the read and write requests to the second host machine if the full data synchronization from the second host machine B to the backup host machine C is not finished; the second host machine B stores data to be written in the second host machine B based on the write request, or acquires the specified data based on the read request and transmits the specified data to the backup host machine C; the backup host machine C transmits the specified data to the calling party. In the embodiment, the first processing unit 40 includes:

a Qemu module of the backup host machine C, for acquiring the read and write requests from the ring buffer.

A Qemu module of the backup host machine C, for transmitting the read and write requests to a Sync Orig module of the host operating system.

A Sync Orig module in the host operating system, for transmitting the read and write requests to the Sync Term module of the second host machine B.

A Sync Term module of the second host machine B, for receiving the read and write requests, and storing the data to be written in the local disk of the second host machine B based on the write request.

A Sync Term module of the second host machine B, for acquiring the specified data from the local disk of the second host machine B based on the read request, and transmitting the specified data to the Sync Orig module of the backup host machine C.

A Sync Orig module of the backup host machine, for receiving the specified data, and transmitting the specified data to the Qemu module of the backup host machine C.

A Qemu module of the backup host machine C, for transmitting the specified data to the guest operating system of the backup host machine C, so as to transmit to the calling party.

Further, a pseudo code of transferring the read and write requests of the virtual machine of the backup host machine C to the second host machine B to be processed is as follows.

Before the Qemu module of the backup host machine C is started, in its configuration file, a remoteIO flag is set to be True.

When the Qemu module of the backup host machine C is started, it is read that remoteIO=True, the local disk access is not performed on each of the IO requests received since then (that is, the read and write requests), but the Sync Orig module is notified by the shared memory to forward the IO requests to the second host machine B.

After the Sync Term module of the second host machine B receives the write request of the Sync Orig module of the backup host machine C, the write data is stored in the local disk of the backup host machine C.

After the Sync Term module of the second host machine B receives the write request of the Sync Orig module of the backup host machine C, and the specified data is read from the specified sector, the request is transmitted back to the Sync Orig module of the backup host machine C through TCP.

After the Sync Orig module of the backup host machine C receives the specified data fed back by the second host machine B, this fed-back specified data is written in the shared memory, and the Qemu module of the backup host machine C is notified through a TCP message.

After the Qemu module of the backup host machine C receives the TCP message notification of the Sync Orig module of the backup host machine C, the specified data is acquired from the specified shared memory and fed back to the calling party.

After the virtual machine is stable in the backup host machine, the data synchronization from the second host machine B to the backup host machine C is started. After the storage migration of the virtual machine to the backup host machine C is finished, a pseudo code of starting the process of the full data synchronization from the second host machine B to the backup host machine C is as follows.

The Sync Term module of the second host machine B transmits the written sectors to the Sync Orig module of the backup host machine C one by one by analyzing a writing situation of the sectors of a qcow2 file of the local disk. After the Sync Orig module of the backup host machine C receives the synchronized sector data transmitted from the Sync Term module of the second host machine B, the data content is written in the qcow2 file of the local disk.

The pseudo code executed in the second host machine B is as follows:

```
For(every written sector)
    { Send_to_hostC(sectorIdx, sector_data); }
```

The pseudo ocode executed in the backup host machine C is as follows:

```
For(sector_data receive from hostB)
    { Write(qcow2file, sectorIdx, sector_data); }
```

After the full data synchronization is finished, the backup host machine C recovers the read and write requests of the virtual machine to be executed in the local disk of the backup host machine C, and does not forward the read and write requests to the second host machine B. At this point, the pseudo code executed in the second host machine B is as follows:

```
If(every_writen_sector_send == true)
    { Send_to_hostC(all_data_synchronized = true); }
```

The pseudo code executed in the backup host machine C is as follows:

```
If(Received_msg(hostB, all_data_synchronized = true))
    { Qemu.remoteIO = False; }
```

Third Embodiment

Figure 6:
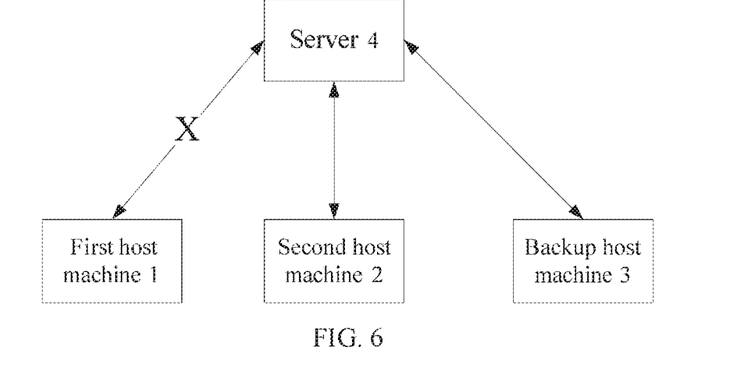
FIG. 6 is a schematic block diagram of a virtual machine quick recovery device according to the third embodiment of the present application.
Figure 7:
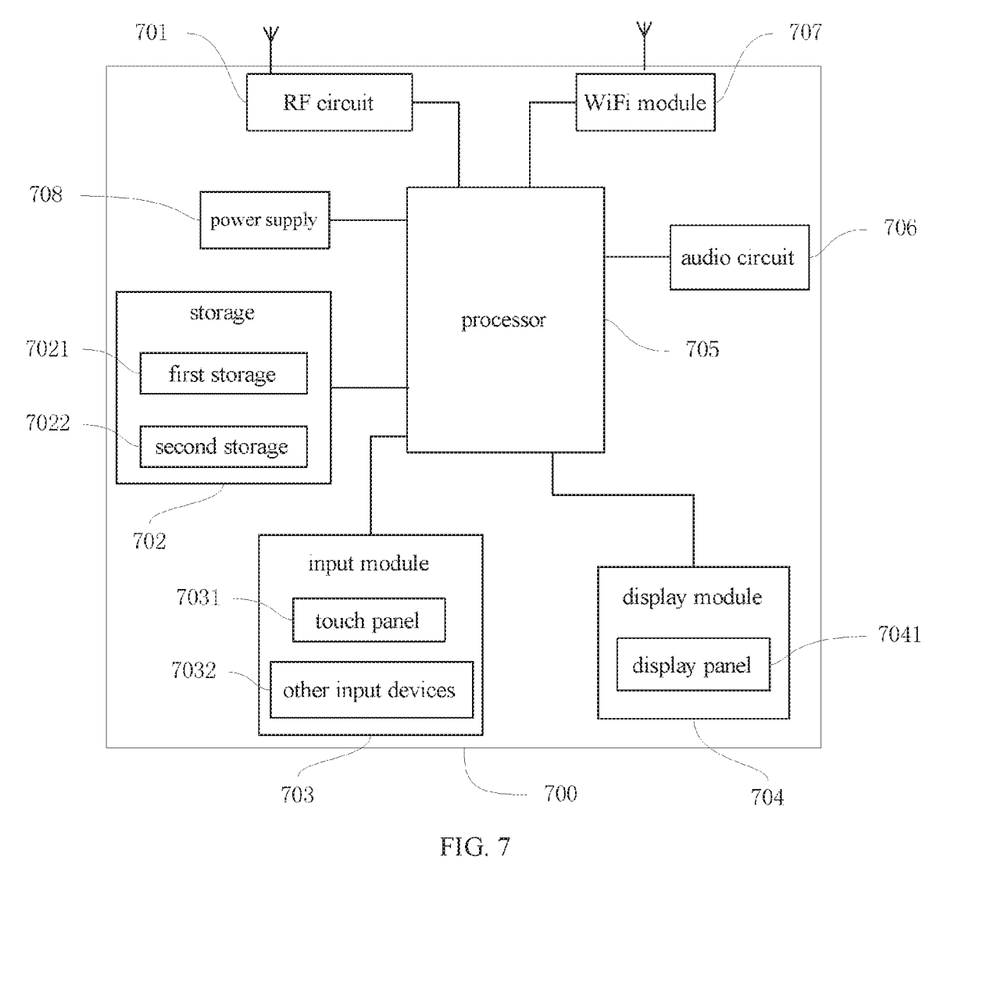
FIG. 7 is a schematic block diagram of a tablet PC according to the third embodiment of the present application.

FIG. 6 is a schematic block diagram of a virtual machine quick recovery system according to the third embodiment of the present application. As shown in FIG. 6, the virtual machine quick recovery system includes a server 4, a first host machine 1, a second host machine 2 and a backup host machine 3 which are connected with the server 4. The first host machine 1, the second host machine 2 and the backup host machine 3 may be terminals such as a mobile phone, a tablet PC, a personal digital assistant (PDA), a desktop PC, a server, or the like. Taking the tablet PC as an example, as shown in FIG. 7, each tablet PC 700 includes a radiofrequency (RF) circuit 701, a storage 702, an input module 703, a display module 704, a processor 705, an audio circuit 706, a WiFi (Wireless Fidelity) module 707, and a power supply 708.

As a user interaction device of the tablet PC 700, the input module 703 connected with the processor 705 is used for realizing the interaction between the user and the tablet PC 700. The input module 703 of the first host machine 1 receives the first backup storage instruction input by the user, and transmits the first backup storage instruction to the corresponding processor 705, the first backup storage instruction including a peer pair ID. The input module of the second host machine 2 receives the second backup storage instruction input by the user, and transmits the second backup storage instruction to the corresponding processor 705, the second backup storage instruction including a peer pair ID. The first backup storage instruction and the second backup storage instruction include the same peer pair ID, so as to form the first host machine 1 and the second host machine 2 into the storage peer pair based on the first backup storage instruction and the second backup storage instruction, so that the read and write requests of the virtual machine of the first host machine 1 are backed up in the second host machine 2. Correspondingly, the input module 703 of the backup host machine 3 receives a virtual machine startup instruction input from the user, and transmits the virtual machine startup instruction to the processor 705. The virtual machine startup instruction includes the peer pair ID the same as the second backup storage instruction, such that the virtual machine of the first host machine 1 is started in the backup host machine 3 when the first host machine 1 goes down or powers off.

In some embodiments, the input module 703 is used for receiving number or character information input by the user and generating a signal input related to user settings and function control of the tablet PC 700. In some embodiments, the input module 703 may include a touch panel 7031. The touch panel 7031, also referred to as a touch screen, may collect touch operations by a user performed on or near the touch panel (for example, the operations of a user performed on the touch panel 7031 by using any suitable object or accessory such as a finger and a touch pen), and drive a corresponding connection device according to a preset program. Optionally, the touch panel 7031 may include a touch detection device and a touch controller. The touch detection device is used for detecting a touch orientation of the user, and detecting a signal from the touch operation, and sending the signal to the touch controller; the touch controller receives touch information from the touch detection device, converts it into a touch coordinate, and then sends the same to the processor 705, and is able to receive a command from the processor 705 and execute it. Additionally, the touch panel 7031 may be implemented into a resistance type, a capacitance type, an infrared type and a surface acoustic wave type. Beside the touch panel 7031, the input module 703 may further include other input devices 7032, including, but not limited to, one or more of a physical keyboard, function keys (for example, a volume key, an on/off key, or the like), trackball, mouse, operating lever, or the like.

In some embodiments, the display module 704 is configured to display information input from the user or the information provided to the user and various menu interfaces of the tablet PC 700. The display module 704 may include a display panel 7041, which may be optionally configured in the form of a LCD or an OLED (organic light-emitting diode).

It is understood that the touch panel 7031 may cover the display panel 7041, to form a touch display screen. Having detected the touch operation on or near the touch display screen, the touch display screen sends the touch operation to the processor 705, so as to determine the type of a touch event. Afterwards, the processor 705 provides the corresponding visual output on the touch display screen according to the type of the touch event.

The touch display screen includes an application program interface display area and a common control display area. The arrangements of the application program interface display area and the common control display area are not limited, and the application program interface display area and the common control display area may be arranged up and down or left and right. This application program interface display area may be used for displaying the interface of the application program. Each interface may include interface elements such as an icon and/or a home screen widget of at least one application program. This application program interface display area may also be a blank interface without any content. This common control display area is configured to display controls with a relatively high usage frequency, for example an application program icon such as setting buttons, interface numbers, scroll bars, phone book icons, or the like.

As a network interface of the tablet PC 700, the WiFi module 707 may realize the data interaction between the tablet PC 700 and other devices. The network interface is connected with a remote storage device (that is, the calling party) through network communication. In the present embodiment, the WiFi module 707 in the backup host machine 3 may receive the read and write requests from the remote storage device (that is, the calling party), acquires the specified data corresponding to the write request after the read and write requests are processed by the processor 705, and transmits the specified data to the calling party through the WiFi module 707. In the embodiment, the remote storage device (that is, the calling party) connected with the network interface through the WiFi network may be a cloud server or other databases.

The storage 702 includes a first storage 7021 and a second storage 7022. In some embodiments, the first storage 7021 may be a non-volatile computer readable storage medium, in which the operating system, the database and the computer executable instruction are stored. The computer executable instruction may be executed by the processor 705, for implementing the virtual machine quick recovery method according to the first embodiment as shown in FIG. 1. The database stored in the storage 702 is used for storing various data, for example, various data involving in the above-mentioned virtual machine quick recovery method, such as the specified data corresponding to the read request and the data to be written corresponding to the write request, or the like. The second storage 7021 may be an internal storage of the tablet PC 700, providing a caching operating environment for the operating system, database and computer executable instruction in the non-volatile computer executable storage medium.

In the present embodiment, the processor 705 is a control center of the tablet PC 700, connects each of parts of the whole mobile phone by using various interfaces and circuits, executes various functions and processing data of the tablet PC 700 by operating or executing the computer executable instruction stored in the first storage 7021 and/or the data in the database, thereby entirely monitoring the tablet PC 700. Optionally, the processor 705 may include one or more processing modules.

In the present embodiment, by executing the computer executable instruction stored in the first storage 7021 and/or the data in the database, the processor 705 is used for executing the following steps. The first host machine and the second host machine are formed into a storage peer pair, such that the read and write requests of a virtual machine of the first host machine are backed up in the second host machine; when the first host machine goes down or powers off, the backup host machine starts the virtual machine of the first host machine; the virtual machine started in the backup host machine receives the read and write requests transmitted by a calling party, and judges whether full data synchronization from the second host machine to the backup host machine is finished or not; if the full data synchronization from the second host machine to the backup host machine is not finished, the read and write requests are transmitted to the second host machine; the second host machine receives the read and write requests, stores the data to be written in the second host machine based on the write request, or acquires the specified data based on the read request and transmits the specified data to the backup host machine; the backup host machine transmits the specified data to the calling party.

The processor 705 further executes the following steps: executing the read and write requests in the backup host machine if the full data synchronization from the second host machine to the backup host machine is finished, and backing up the read and write requests of the virtual machine of the backup host machine in the second host machine.

Optionally, the processor 705 further executes the following steps: receiving the read and write requests by the guest operating system of the backup host machine, and putting the read and write requests in a ring buffer;

acquiring, by the Qemu module of the backup host machine, the read and write requests from the ring buffer, and transmitting the read and write requests to the Sync Orig module of the host operating system; the Sync Orig module transmits the read and write requests to the second host machine;

receiving, by the Sync Term module of the second host machine, the read and write requests; storing the data to be written in the local disk of the second host machine based on the write request; or acquiring the specified data from the local disk of the second host machine based on the read request, and transmitting the specified data to the Sync Orig module of the backup host machine;

receiving, by the Sync Orig module of the backup host machine, the specified data, and transmitting the specified data to the Qemu module of the backup host machine;

transmitting, by the Qemu module of the backup host machine, the specified data to the guest operating system of the backup host machine.

Preferably, the backing up the data of the virtual machine of the first host machine in the second host machine includes:

receiving, by the guest operating system of the first host machine, the read and write requests, and putting the read and write requests in the ring buffer;

acquiring, by the Qemu module of the first host machine, the read and write requests from the ring buffer; acquiring, by the Qemu module, the specified data from the local disk of the first host machine A based on the read request; or storing, by the Qemu module, the data to be written in the local disk of the first host machine A based on the write request; transmitting the write request to the Sync Orig module of the host operating system;

transmitting, by the Sync Orig module of the host operating system, the write request to the Sync Term module of the second host machine;

receiving, by the Sync Term module of the second host machine, the write request, and storing the data to be written corresponding to the write request in the local disk of the second host machine.

Preferably, the processor 705 further executes the following steps: judging, by the second host machine, whether the current operating index reaches the preset condition;

if the current operating index reaches the preset condition, synchronizing the read and write requests of the virtual machine of the first host machine backed up in the second host machine, in the backup host machine;

judging whether there is unsynchronized data in the second host machine;

if there is unsynchronized data in the second host machine, the full data synchronization from the second host machine to the backup host machine is not finished;

if there is no unsynchronized data, the full data synchronization from the second host machine to the backup host machine is finished, and the notification of the completion of synchronization is transmitted to the backup host machine.

In the virtual machine quick recovery system according to the present embodiment, when the first host machine goes down or powers off, the virtual machine on the first host machine is started in the backup host machine; when the full data synchronization from the second host machine to the backup host machine is not finished, the read and write requests received by the virtual machine of the backup host machine are forwarded to and executed in the second host machine with virtual machine backup data, which may realize quick migration and failure recovery of the virtual machine without storage, does not need the shared storage, improve robust of the virtual machine, and avoid interruption of service on the virtual machine due to the absence of available storage to be accessed by the virtual machine.

Persons of ordinary skill in the art may further appreciate that, in combination with the examples described in the embodiments herein, units and algorithm steps can be implemented by electronic hardware, computer software, or a combination thereof. Whether the functions are executed by hardware or software depends on particular applications and design constraint conditions of the technical solutions. Persons skilled in the art may use different methods to implement the described functions for every particular application, but it should not be considered that the implementation goes beyond the scope of the present application.

Those skilled in the art may clearly understand that, to describe conveniently and simply, for specific working processes of the system, the apparatus, and the unit described in the foregoing, reference may be made to corresponding processes in the foregoing method embodiments, which are not repeated here.

In several embodiments of the present application, it should be understood that the disclosed apparatus and method may be implemented in other ways. For example, the apparatus embodiments described in the following are only exemplary, for example, the unit division is only logic function division, and there may be other division ways during practical implementation, for example, multiple units or components may be combined or integrated into another system, or some features may be omitted or may not be executed. In addition, the shown or discussed mutual couplings or direct couplings or communication connections maybe implemented through some interfaces. Indirect couplings or communication connections between apparatuses or units may be electrical, mechanical, or in other forms.

The modules described as separated parts may or may not be physically separated from each other, and the parts shown as modules may or may not be physical modules, that is, they may be located at the same place, and may also be distributed to multiple network elements. A part or all of the modules may be selected according to an actual requirement to achieve the objectives of the solutions in the embodiments.

In addition, function modules in each of the embodiments of the present application may be integrated into a processing module, each of the modules may also exist separately and physically, and two or more modules may also be integrated into one module.

If the function is implemented in the form of a software function module and is sold or used as an independent product, it may be stored in a computer readable storage medium. Based on such understanding, the technical solutions of the present application essentially, or the part contributing to the prior art, or all or a part of the technical solutions may be implemented in the form of a software product. The computer software product is stored in a storage medium and includes several instructions for instructing a computer device (which may be a personal computer, a server, or a network device, and so on.) to execute all or a part of steps of the methods described in the embodiments of the present application. The storage medium includes: any medium that is capable of storing program codes, such as a USE-disk, a removable hard disk, a read-only memory (Read-Only Memory, referred to as ROM), a random access memory (Random Access Memory, referred to as RAM), a magnetic disk, or an optical disk.

The foregoing descriptions are merely exemplary and specific embodiments of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A virtual machine quick recovery method, comprising:
    forming a first host machine and a second host machine into a storage peer pair, such that read and write requests of a virtual machine of the first host machine are backed up in the second host machine; starting, by a backup host machine, the virtual machine of the first host machine when the first host machine goes down or powers off; receiving, by the virtual machine started in the backup host machine, read and write requests transmitted by a calling party, and judging whether full data synchronization from the second host machine to the backup host machine is finished or not; if the full data synchronization from the second host machine to the backup host machine is not finished, transmitting the read and write requests to the second host machine; receiving, by the second host machine, the read and write requests; wherein the method further comprises at least one of: storing data to be written in the second host machine based on the write request; and acquiring specified data based on the read request and transmitting the specified data to the backup host machine and transmitting, by the backup host machine, the specified data to the calling party; wherein the method further comprises: receiving, by a guest operating system of the backup host machine, the read and write requests, and putting the read and write requests in a ring buffer; acquiring, by a Qemu module of the backup host machine, the read and write requests from the ring buffer, and transmitting the read and write requests to a Sync Orig module in a host operating system; the Sync Orig module transmitting the read and write requests to the second host machine; receiving, by a Sync Term module of the second host machine, the read and write requests; storing the data to be written in a local disk of the second host machine based on the write request; or acquiring the specified data in the local disk of the second host machine based on the read request, and transmitting the specified data to the Sync Orig module of the backup host machine; receiving, by a Sync Orig module of the backup host machine, the specified data, and transmitting the specified data to the Qemu module of the backup host machine; and transmitting, by the Qemu module of the backup host machine, the specified data, and transmitting the specified data to the guest operating system of the backup host machine.

2. The virtual machine quick recovery method according to claim 1, further comprising: if the full data synchronization from the second host machine to the backup host machine is finished, executing the read and write requests in the backup host machine, and backing up the read and write requests of the virtual machine of the backup host machine in the second host machine.

3. The virtual machine quick recovery method according to claim 1, wherein the backing up the data of the virtual machine of the first host machine in the second host machine comprises:
    receiving, by the guest operating system of the first host machine, the read and write requests, and putting the read and write requests in a ring buffer;
    acquiring, by the Qemu module of the first host machine, the read and write requests from the ring buffer; acquiring, by the Qemu module, the specified data from a local disk of the first host machine A based on the read request; or storing, by the Qemu module, the data to be written in the local disk of the first host machine based on the write request; and transmitting the write request to the Sync Orig module of the host operating system;
    transmitting, by the Sync Orig module of the host operating system, the write request to the Sync Term module of the second host machine; and
    receiving, by the Sync Term module of the second host machine, the write request, and storing the data to be written corresponding to the write request in the local disk of the second host machine.

4. The virtual machine quick recovery method according to claim 1, further comprising:
    judging, by the second host machine, whether a current operating index reaches a preset condition;
    if the current operating index reaches the preset condition, synchronizing the read and write requests of the virtual machine of the first host machine backed up in the second host machine, in the backup host machine;
    judging whether there is unsynchronized data in the second host machine;

determining that the full data synchronization from the second host machine to the backup host machine is not finished if there is unsynchronized data in the second host machine; and determining that the full data synchronization from the second host machine to the backup host machine is finished, and transmitting a notification of completion of synchronization to the backup host machine if there is no unsynchronized data.

5. A virtual machine quick recovery device, comprising: a data backup unit, configured to form a first host machine and a second host machine into a storage peer pair, such that read and write requests of a virtual machine of the first host machine are backed up in the second host machine; a backup machine starting unit, configured to start, by a backup host machine, the virtual machine of the first host machine when the first host machine goes down or powers off; a request judging unit, configured to make the virtual machine started in the backup host machine receive read and write requests transmitted by a calling party, and to judge whether full data synchronization from the second host machine to the backup host machine is finished or not; if the full data synchronization from the second host machine to the backup host machine is not finished, the request judging unit to transmit the read and write requests to the second host machine; a first processing unit, configured to make the second host machine receive the read and write requests; wherein the device further comprises a data transmitting unit and is further configured to implement at least one of: storing, through the first processing unit, data to be written in the second host machine based on the write request; and acquiring specified data based on the read request and transmitting the specified data to the backup host machine, and making, through the data transmitting unit, the backup host machine transmit the specified data to the calling party; wherein the device further comprises: a guest operating system of the backup host machine, configured to receive the read and write requests, and putting the read and write requests in a ring buffer; a Qemu module of the backup host machine, configured to acquire the read and write requests from the ring buffer, and to transmit the read and write requests to a Sync Orig module in a host operating system, wherein the Sync Orig module transmits the read and write requests to the second host machine; a Sync Term module of the second host machine, configured to receive the read and write requests; to store the data to be written in a local disk of the second host machine based on the write request; or to acquire the specified data in the local disk of the second host machine based on the read request, and to transmit the specified data to the Sync Orig module of the backup host machine; a Sync Orig module of the backup host machine, configured to receive the specified data, and to transmit the specified data to the Qemu module of the backup host machine; a Qemu module of the backup host machine, configured to transmit the specified data to the guest operating system of the backup host machine.

6. The virtual machine quick recovery device according to claim 5, further comprising a second processing unit, wherein the second processing unit is configured to execute the read and write requests in the backup host machine and to back up the read and write requests of the virtual machine of the backup host machine in the second host machine if the full data synchronization from the second host machine to the backup host machine is finished.

7. The virtual machine quick recovery device according to claim 5, wherein the data backup unit comprises:
a guest operating system of the first host machine, configured to receive the read and write requests, and to put the read and write requests in a ring buffer;
a Qemu module of the first host machine, configured to acquire the read and write requests from the ring buffer; to acquire, by the Qemu module, the specified data from a local disk of the first host machine based on the read request; or to store, by the Qemu module, the data to be written in the local disk of the first host machine based on the write request; and to transmit the write request to the Sync Orig module of a host operating system;
a Sync Orig module of the host operating system, configured to transmit the write request to the Sync Term module of the second host machine; and
a Sync Term module of the second host machine, configured to receive the write request, and to store the data to be written corresponding to the write request in the local disk of the second host machine.

8. The virtual machine quick recovery device according to claim 5, wherein the request judging unit comprises:
a first judging subunit, configured to make the second host machine judge whether a current operating index reaches a preset condition;
a first synchronization subunit, configured to synchronize the read and write requests of the virtual machine of the first host machine backed up in the second host machine, in the backup host machine if the current operating index reaches the preset condition;
a second judging subunit, configured to judge whether there is unsynchronized data in the second host machine;
a first determining subunit, configured to determine that the full data synchronization from the second host machine to the backup host machine is not finished if there is unsynchronized data; and
a second determining subunit, configured to determine that the full data synchronization from the second host machine to the backup host machine is finished, and to transmit a notification of completion of synchronization to the backup host machine if there is no unsynchronized data.

9. A virtual machine quick recovery system, comprising a first host machine, a second host machine and a backup host machine; the first host machine, the second host machine and the third host machine are provided with processors respectively, the processor executing the following steps: forming a first host machine and a second host machine into a storage peer pair, such that read and write requests of a virtual machine of the first host machine are backed up in the second host machine; starting, by a backup host machine, the virtual machine of the first host machine when the first host machine goes down or powers off; receiving, by the virtual machine started in the backup host machine, read and write requests transmitted by a calling party, and judging whether full data synchronization from the second host machine to the backup host machine is finished or not; if the full data synchronization from the second host machine to the backup host machine is not finished, transmitting read and write requests to the second host machine; receiving, by the second host machine, the read and write requests; wherein the processor further executes at least one of the following steps: storing data to be written in the second host machine based on the write request; and acquiring specified data based on the read request and transmitting the specified data to the backup host machine, and transmitting, by the backup host machine, the specified data to the calling party; wherein the system further comprises: receiving, by a guest operating system of the backup host machine, the read and write requests, and putting the read and write requests in a ring buffer; acquiring, by a Qemu module of the backup host machine, the read and write requests from the ring buffer, and transmitting the read and write requests to a Sync Orig module in a host operating system; the Sync Orig module transmitting the read and write requests to the second host machine; receiving, by a Sync Term module of the second host machine, the read and write requests; storing the data to be written in a local disk of the second host machine based on the write request; or acquiring the specified data in the local disk of the second host machine based on the read request, and transmitting the specified data to the Sync Orig module of the backup host machine; receiving, by a Sync Orig module of the backup host machine, the specified data, and transmitting the specified data to the Qemu module of the backup host machine; and transmitting, by the Qemu module of the backup host machine, the specified data, and transmitting the specified data to the guest operating system of the backup host machine.

10. The virtual machine quick recovery system according to claim 9, further comprising: if the full data synchronization from the second host machine to the backup host machine is finished, executing the read and write requests in the backup host machine, and backing up the read and write requests of the virtual machine of the backup host machine in the second host machine.

11. The virtual machine quick recovery system according to claim 9, wherein the backing up the data of the virtual machine of the first host machine in the second host machine comprises:
  receiving, by a guest operating system of the first host machine, the read and write requests, and putting the read and write requests in the ring buffer;
  acquiring, by the Qemu module of the first host machine, the read and write requests from the ring buffer; acquiring, by the Qemu module, the specified data from a local disk of the first host machine A based on the read request; or storing, by the Qemu module, the data to be written in the local disk of the first host machine based on the write request; and transmitting the write request to the Sync Orig module of a host operating system;
  transmitting, by the Sync Orig module of the host operating system, the write request to the Sync Term module of the second host machine; and
  receiving, by the Sync Term module of the second host machine, the write request, and storing the data to be written corresponding to the write request in the local disk of the second host machine.

12. The virtual machine quick recovery system according to claim 9, further comprising:
  judging, by the second host machine, whether a current operating index reaches a preset condition;
  if the current operating index reaches the preset condition, synchronizing the read and write requests of the virtual machine of the first host machine backed up in the second host machine, in the backup host machine;
  judging whether there is unsynchronized data in the second host machine;
  determining that the full data synchronization from the second host machine to the backup host machine is not finished if there is unsynchronized data in the second host machine; and
  determining that the full data synchronization from the second host machine to the backup host machine is finished, and transmitting a notification of completion of synchronization to the backup host machine if there is no unsynchronized data.

13. The virtual machine quick recovery system according to claim 9, wherein the first host machine, the second host machine and the backup host machine further comprise user interaction devices connected with the processors;
  the user interaction device on the first host machine and the second host machine is used for receiving a first backup storage instruction and a second backup storage instruction input by the user, forming the first host machine and the second host machine into the storage peer pair based on the first backup storage instruction and the second backup storage instruction; the first backup storage instruction and the second backup storage instruction comprise the same peer pair ID;
  the user interaction device in the backup host machine is used for receiving a virtual machine startup instruction input from the user, such that the virtual machine of the first host machine is started in the backup host machine when the first host machine goes down or powers off; the virtual machine startup instruction comprising the peer pair ID.

14. The virtual machine quick recovery system according to claim 9, wherein the backup host machine further comprises a network interface connected with the processor, the network interface for receiving read and write requests transmitted from the calling party, and transmitting the specified data to the calling party.

15. The virtual machine quick recovery system according to claim 9, wherein the storage of the first host machine is provided with a database for storing data corresponding to the read and write requests of the virtual machine of the first host machine;
  the storage of the second host machine is provided with a database for storing data corresponding to the read and write requests of the virtual machine of the first host machine, and storing data corresponding to the read and write requests of the virtual machine of the first host machine started in the backup host machine;
  the storage of the backup host machine is provided with a database for storing data corresponding to the read and write requests of the virtual machine of the first host machine, and storing data corresponding to the read and write requests of the virtual machine of the first host machine started in the backup host machine.

* * * * *